(12) United States Patent
Huang

(10) Patent No.: US 11,743,176 B2
(45) Date of Patent: *Aug. 29, 2023

(54) PACKET PROCESSING METHOD AND SYSTEM, AND DEVICE

(71) Applicant: HUAWEI TECHNOLOGIES CO., LTD., Guangdong (CN)

(72) Inventor: Yong Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,400

(22) Filed: Nov. 22, 2021

(65) Prior Publication Data

US 2022/0141129 A1 May 5, 2022

Related U.S. Application Data

(63) Continuation of application No. 16/663,101, filed on Oct. 24, 2019, now Pat. No. 11,206,210, which is a
(Continued)

(30) Foreign Application Priority Data

Sep. 18, 2013 (CN) .......................... 201310430811.0

(51) Int. Cl.
*H04L 12/703* (2013.01)
*H04L 45/28* (2022.01)
(Continued)

(52) U.S. Cl.
CPC .......... *H04L 45/28* (2013.01); *H04L 12/6418* (2013.01); *H04L 47/125* (2013.01); *H04L 47/17* (2013.01)

(58) Field of Classification Search
CPC ........ H04L 45/28; H04L 47/125; H04L 47/17
See application file for complete search history.

(56) References Cited

U.S. PATENT DOCUMENTS

| | | | |
|---|---|---|---|
| 6,600,751 | B1 | 7/2003 | Couturier |
| 7,181,614 | B1 | 2/2007 | Gehrmann et al. |

(Continued)

FOREIGN PATENT DOCUMENTS

| | | |
|---|---|---|
| CN | 1691640 A | 11/2005 |
| CN | 101426031 A | 5/2009 |

(Continued)

*Primary Examiner* — Zhiren Qin
(74) *Attorney, Agent, or Firm* — WOMBLE BOND DICKINSON (US) LLP

(57) ABSTRACT

Disclosed is a packet processing method and system, and a device. A status value used to identify a topology status of service nodes at a specified time is preconfigured for a packet in a packet flow, so that when a service node in a next hop is selected for the packet, selection is performed not based on a topology status of current actual service nodes in the next hop, but based on the topology status, which is identified by the status value, of the service nodes at the specified time. As long as status values carried in packets in a same packet flow are the same, even if a topology status of service nodes changes, a same service node can still be selected for the packets in the same packet flow, thereby avoiding a problem of diversion of the packets in the same packet flow.

20 Claims, 9 Drawing Sheets

Related U.S. Application Data continuation of application No. 15/073,130, filed on Mar. 17, 2016, now Pat. No. 10,498,634, which is a continuation of application No. PCT/CN2014/086841, filed on Sep. 18, 2014.

(51) Int. Cl.
*H04L 12/64* (2006.01)
*H04L 47/125* (2022.01)
*H04L 47/17* (2022.01)

(56) References Cited

U.S. PATENT DOCUMENTS

| | | | |
|---|---|---|---|
| 7,227,867 B1 | 6/2007 | Ferguson et al. | |
| 7,254,138 B2* | 8/2007 | Sandstrom | H04L 45/24 |
| | | | 370/252 |
| 8,111,702 B1* | 2/2012 | Wijnands | H04L 45/64 |
| | | | 370/408 |
| 8,165,059 B2 | 4/2012 | Fujii et al. | |
| 8,798,048 B1 | 8/2014 | Hui et al. | |
| 9,571,387 B1* | 2/2017 | Atlas | H04L 12/1877 |
| 9,716,592 B1 | 7/2017 | Mandal et al. | |
| 2002/0044549 A1 | 4/2002 | Johansson et al. | |
| 2004/0233918 A1 | 11/2004 | Larsson et al. | |
| 2005/0050221 A1 | 3/2005 | Tasman et al. | |
| 2005/0204042 A1 | 9/2005 | Banerjee et al. | |
| 2007/0086387 A1 | 4/2007 | Kang et al. | |
| 2008/0101406 A1* | 5/2008 | Matoba | H04L 47/127 |
| | | | 370/468 |
| 2008/0181118 A1* | 7/2008 | Sharma | H04L 45/02 |
| | | | 370/351 |
| 2009/0279481 A1 | 11/2009 | Vidal et al. | |
| 2010/0074161 A1 | 3/2010 | Munari et al. | |
| 2010/0080226 A1 | 4/2010 | Khalid et al. | |
| 2011/0199941 A1 | 8/2011 | Ouellette et al. | |
| 2012/0163180 A1* | 6/2012 | Goel | H04L 45/306 |
| | | | 370/238 |
| 2013/0148658 A1 | 6/2013 | Khanna et al. | |
| 2014/0153403 A1 | 6/2014 | Allan et al. | |

FOREIGN PATENT DOCUMENTS

| | | |
|---|---|---|
| CN | 101436989 A | 5/2009 |
| CN | 101640681 A | 2/2010 |
| CN | 101656671 A | 2/2010 |
| CN | 102171974 A | 8/2011 |
| CN | 102316014 A | 1/2012 |
| CN | 102893555 A | 1/2013 |
| CN | 103181131 A | 6/2013 |
| CN | 103220217 A | 7/2013 |

\* cited by examiner

PACKET PROCESSING METHOD AND SYSTEM, AND DEVICE

CROSS-REFERENCE TO RELATED APPLICATIONS

This application is a continuation of U.S. patent application Ser. No. 16/663,101, filed on Oct. 24, 2019, which is a continuation of U.S. patent application Ser. No. 15/073,130, filed on Mar. 17, 2016, now U.S. Pat. No. 10,498,634, which is a continuation of International Application No. PCT/CN2014/086841, filed on Sep. 18, 2014, which claims priority to Chinese Patent Application No. 201310430811.0, filed on Sep. 18, 2013. All of the aforementioned patent applications are hereby incorporated by reference in their entireties.

TECHNICAL FIELD

Embodiments of the invention relate to the field of wireless communications, and in particular, to a packet processing method and system, and a device.

BACKGROUND

In a service routing process, service nodes, such as a firewall, a Transmission Control Protocol (TCP) acceleration node, and a network address translation (NAT) node, that have network functions such as security authentication, filtering, statistical monitoring, charging, and flow acceleration form a network topology architecture of the service nodes, and are deployed on a path through which a service flow passes, so that when the service flow passes through these service nodes, a corresponding network function can be executed for the service flow.

However, in a network topology architecture deployed for a service, a quantity of service nodes changes, for example, the quantity of deployed service nodes is increased or decreased according to a change in a degree to which a network is busy, or the quantity is decreased when a fault occurs in a service node, that is, the quantity of service nodes deployed in the network topology architecture dynamically changes. For a packet flow in a service flow, when packets in the packet flow successively pass through service nodes of a hop, a quantity of the service nodes changes, for example, one service node is added, a problem that the packet flow is diverted (that is, service nodes through which the first several packets in the packet flow pass are different from service nodes through which the last several packets pass) may be caused. In this case, packet missequencing easily occurs in the packets in the packet flow. In addition, for a service node having a packet status recording requirement, the status recording requirement of the service node cannot be met.

SUMMARY

Embodiments of the invention provide a packet processing method and system, and a device, which are used to resolve a prior-art problem that a packet flow is diverted because a topology status of service nodes changes.

According to a first aspect, a packet processing method is provided, where the method includes:

when determining that there are multiple service nodes in a next hop of a packet, determining, according to a status value that is carried in the packet and that is used to identify a topology status of service nodes at a specified time, service nodes that are identified by the status value in the next hop; and selecting one service node from the service nodes that are identified by the status value in the next hop, and sending the packet to the selected service node, where status values carried in all packets in a same packet flow are the same.

With reference to the first aspect, for multiple packet flows aggregated to a same service flow, a status value carried in a packet in any packet flow identifies a topology status of service nodes when the packet flow is generated.

With reference to the first aspect, the topology status of the service nodes includes a quantity of service nodes of a same service.

With reference to the first aspect, the status value carried in the packet is generated by a central control module and delivered to a flow classification module, and then is added by the flow classification module to a packet of a currently generated packet flow.

With reference to the first aspect, the central control module monitors a topology status of service nodes, updates the status value when the topology status of the service nodes changes, and sends an updated status value to the flow classification module; and the flow classification module adds the updated status value to a packet of a currently generated packet flow.

With reference to the first aspect, the selecting one service node from the service nodes that are identified by the status value in the next hop includes:

performing a load balancing operation by using a value of a quantity of the service nodes that are identified by the status value in the next hop, and selecting one service node according to an operation result.

With reference to the first aspect, the performing a load balancing operation by using a value of a quantity of the service nodes that are identified by the status value in the next hop, and selecting one service node according to an operation result includes:

performing a modulo operation on a predetermined value and the value of the quantity of the service nodes that are identified by the status value in the next hop, and selecting one service node as a next-hop service node according to a modulo operation result.

With reference to the first aspect, the performing a load balancing operation by using a value of a quantity of the service nodes that are identified by the status value in the next hop, and selecting one service node according to an operation result includes:

performing a modulo operation on the predetermined value and the value of the quantity of the service nodes that are identified by the status value in the next hop, performing, according to operation values corresponding to the service nodes that are identified by the status value in the next hop, matching between the modulo operation result and the operation values, and selecting a service node corresponding to an operation value matching the modulo operation result.

With reference to the first aspect, the predetermined value is carried in the packet, or is obtained by converting a transmission parameter that is shared by all packets in a service flow in which the packet is located.

With reference to the first aspect, the predetermined value carried in the packet is delivered by the central control module to the flow classification module, and then is added by the flow classification module to the packet.

With reference to the first aspect, the predetermined value delivered by the central control module to the flow classification module is a value that is randomly selected by the central control module from a resource pool, or is a value that is obtained by the central control module by converting the transmission parameter shared by all the packets in the service flow in which the packet is located, or is a value that is selected by the central control module according to a load status of a service node.

With reference to the first aspect, the method further includes:

reporting, by a service node receiving the packet, quintuple information of the packet flow in which the packet is located and quintuple information of a corresponding backward flow to the central control module, so that when determining, according to the quintuple information of the backward flow, that the backward flow is generated, the central control module delivers the status value carried in the packet in the packet flow to a flow classification module, and the flow classification module adds the status value to a packet of the backward flow, so that the packet of the backward flow is processed in a topology architecture of the service nodes identified by the status value.

With reference to the first aspect, when the predetermined value is carried in the packet received by the service node, when determining that the backward flow is generated, the central control module delivers the predetermined value to the flow classification module of the backward flow, and the flow classification module of the backward flow adds the predetermined value to the packet of the backward flow.

According to a second aspect, a packet processing system is provided, where the system includes: a load balancing device and a service node attached to the load balancing device, where the load balancing device is configured to: when determining that there are multiple service nodes in a next hop of a packet, determine, according to a status value that is carried in the packet and that is used to identify a topology status of service nodes at a specified time, service nodes that are identified by the status value in the next hop; and select one service node from the service nodes that are identified by the status value in the next hop, and send the packet to the selected service node, where status values carried in all packets in a same packet flow are the same; and the service node is configured to receive the packet.

With reference to the second aspect, for multiple packet flows aggregated to a same service flow, a status value carried in a packet in any packet flow identifies a topology status of service nodes when the packet flow is generated.

With reference to the second aspect, the system further includes a central control device and a flow classification device, where the central control device is configured to generate the status value and deliver the status value to the flow classification device; and the flow classification device is configured to add the status value to a packet of a currently generated packet flow.

According to a third aspect, a load balancing device is provided, where the load balancing device includes:

a service node determining unit, configured to: when determining that there are multiple service nodes in a next hop of a packet, determine, according to a status value that is carried in the packet and that is used to identify a topology status of service nodes at a specified time, service nodes that are identified by the status value in the next hop, where status values carried in all packets in a same packet flow are the same;

a service node selection unit, configured to select one service node from the service nodes that are identified by the status value in the next hop; and a packet sending unit, configured to send the packet to the selected service node.

With reference to the third aspect, for multiple packet flows aggregated to a same service flow, a status value carried in a packet in any packet flow identifies a topology status of service nodes when the packet flow is generated.

With reference to the third aspect, the topology status of the service nodes includes a quantity of service nodes of a same service.

With reference to the third aspect, the service node selection unit is configured to perform a load balancing operation by using a value of a quantity of the service nodes that are identified by the status value in the next hop, and select one service node according to an operation result.

With reference to the third aspect, the service node selection unit is configured to perform a modulo operation on a predetermined value and the value of the quantity of the service nodes that are identified by the status value in the next hop, and select one service node as a next-hop service node according to a modulo operation result.

With reference to the third aspect, the service node selection unit is configured to perform a modulo operation on the predetermined value and the value of the quantity of the service nodes that are identified by the status value in the next hop, perform, according to operation values corresponding to the service nodes that are identified by the status value in the next hop, matching between the modulo operation result and the operation values, and select a service node corresponding to an operation value matching the modulo operation result.

With reference to the third aspect, the load balancing device further includes:

a predetermined value determining unit, configured to acquire the carried predetermined value from the packet, or obtain the predetermined value by converting a transmission parameter shared by all packets in a service flow in which the packet is located.

According to a fourth aspect, a load balancing device is provided, where the load balancing device includes:

a processor, configured to: when determining that there are multiple service nodes in a next hop of a packet, determine, according to a status value that is carried in the packet and that is used to identify a topology status of service nodes at a specified time, service nodes that are identified by the status value in the next hop, where status values carried in all packets in a same packet flow are the same; and select one service node from the service nodes that are identified by the status value in the next hop;

an interface, configured to send the packet to the selected service node.

With reference to the fourth aspect, for multiple packet flows aggregated to a same service flow, a status value carried in a packet in any packet flow identifies a topology status of service nodes when the packet flow is generated.

With reference to the fourth aspect, the topology status of the service nodes includes a quantity of service nodes of a same service.

With reference to the fourth aspect, the processor is configured to perform a load balancing operation by using a value of a quantity of the service nodes that are identified by the status value in the next hop, and select one service node according to an operation result.

With reference to the fourth aspect, the processor is configured to perform a modulo operation on a predetermined value and the value of the quantity of the service nodes that are identified by the status value in the next hop, and select one service node as a next-hop service node according to a modulo operation result.

With reference to the fourth aspect, the processor is configured to perform a modulo operation on the predetermined value and the value of the quantity of the service nodes that are identified by the status value in the next hop, perform, according to operation values corresponding to the service nodes that are identified by the status value in the next hop, matching between the modulo operation result and the operation values, and select a service node corresponding to an operation value matching the modulo operation result.

With reference to the fourth aspect, the processor is configured to acquire the carried predetermined value from the packet, or obtain the predetermined value by converting a transmission parameter shared by all packets in a service flow in which the packet is located.

According to a fifth aspect, a central control device is provided, where the central control device includes:

a generation unit, configured to generate a status value;

a sending unit, configured to send the status value to a flow classification device, and instruct the flow classification device to add the status value to a packet.

According to a sixth aspect, a central control device is provided, where the central control device includes:

a processor, configured to generate a status value;

an interface, configured to send the status value to a flow classification device, and instruct the flow classification device to add the status value to a packet.

According to the embodiments, a status value used to identify a topology status of service nodes at a specified time is preconfigured for a packet in a packet flow, so that when a service node in a next hop is selected for the packet, selection is performed not based on a topology status of current actual service nodes in the next hop, but based on the topology status, which is identified by the status value, of the service nodes at the specified time. As long as status values carried in packets in a same packet flow are the same, even if a topology status of service nodes changes, a same service node can still be selected for the packets in the same packet flow, thereby avoiding a problem of diversion of the packets in the same packet flow.

BRIEF DESCRIPTION OF THE DRAWINGS

To describe the technical solutions in the embodiments of the invention more clearly, the following briefly describes the accompanying drawings required for describing the embodiments. Apparently, the accompanying drawings in the following description show merely some embodiments of the invention, and a person of ordinary skill in the art may still derive other drawings from these accompanying drawings without creative efforts.

DETAILED DESCRIPTION

To make the objectives, technical solutions, and advantages of the embodiments of the invention clearer, the following further describes the embodiments of the invention in detail with reference to the accompanying drawings. Apparently, the described embodiments are merely a part rather than all of the embodiments of the invention. All other embodiments obtained by a person of ordinary skill in the art based on the embodiments of the invention without creative efforts shall fall within the protection scope of the embodiments of the invention.

To ensure that flow directions of packets in a same packet flow do not change, the embodiments of the present application provide a packet processing solution. A status value used to identify a topology status of service nodes at a specified time is preconfigured for a packet in a packet flow, so that when a service node in a next hop is selected for the packet, selection is performed not based on a topology status of current actual service nodes in the next hop, but based on the topology status, which is identified by the status value, of the service nodes at the specified time. As long as status values carried in packets in a same packet flow are the same, even if a topology status of service nodes changes in a process in which the packet flow passes through a service node, a same service node can still be selected for the packets in the same packet flow according to the same status values carried in the packets. Therefore, a problem of missequencing of the packets in the same packet flow is avoided, and a processing requirement that a service node (for example, a NAT node) records statuses of the packets in the same packet flow can be met.

A hop described in the embodiments of the present application includes at least one such service node: service nodes having a same network function in a topology architecture of service nodes, where any service node can provide the network function for a packet in a packet flow.

A service node described in the embodiments of the present application refers to a network device, such as a firewall or a switch, that can perform service processing on a packet.

Solutions of the present application are described below with reference to embodiments, and certainly, the solutions of the present application are not limited to the following embodiments.

Embodiment 1

Figure 1:
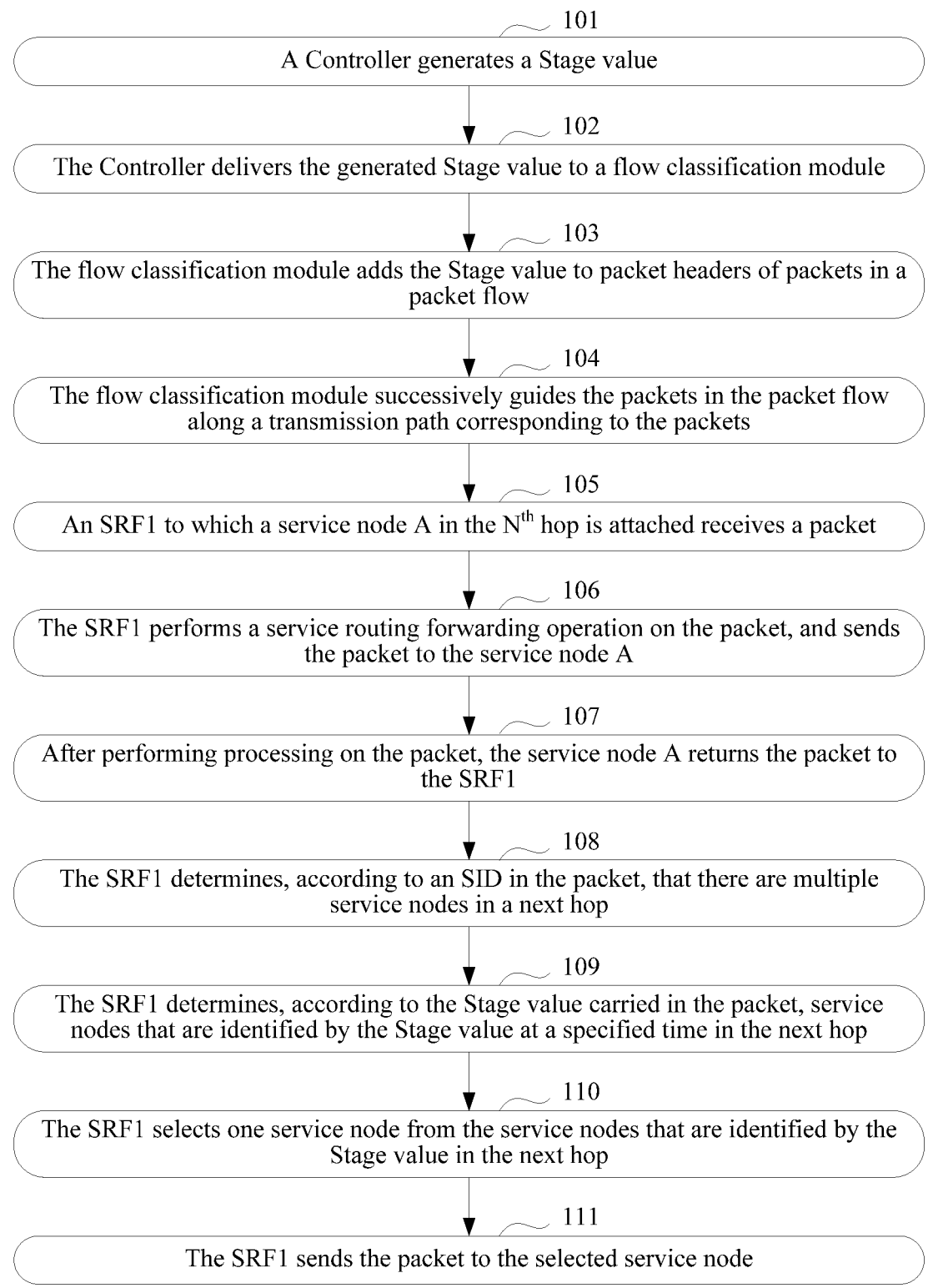
FIG. 1 is a schematic diagram of operations of a packet processing method according to one embodiment.

As shown in FIG. 1, FIG. 1 is a schematic diagram of operations of a packet processing method according to one embodiment of the invention. The method includes the following operations:

Operation 101: A central control module (Controller) generates a Stage value (status value).

The Stage value is used to identify a topology status of service nodes at a specified time. The specified time may refer to a time when the Stage value is generated. The topology status may refer to a quantity of service nodes for a service, and in one embodiment, may be a quantity of service nodes of the service in each hop.

The Controller monitors a topology status of service nodes in real time, and when the topology status of the service nodes changes, for example, a quantity of service nodes is increased or decreased, the Controller updates the Stage value, so that an updated Stage value can identify a topology status of service nodes after a quantity of the service nodes changes.

For example, at a T1 moment, a Stage value generated by the Controller is 0, indicating that at the T1 moment, a topology status of service nodes corresponds to the Stage value being 0; assuming that at a subsequent T2 moment, one service node is added to a hop, the Controller updates the Stage value to 1, indicating that at the T2 moment, an updated topology status of service nodes corresponds to the Stage value being 1.

As long as values of Stage values are not duplicate, topology statuses, which correspond to the Stage values, of service nodes do not conflict. Preferably, an initial Stage value may be set to 0. Each time the topology status of the service nodes changes, 1 is added to the Stage value, and after the Stage value reaches an upper value limit, the Stage value becomes 0 again. As long as the upper value limit of the Stage value is large enough, when the Stage value becomes 0 again after the Stage value reaches the upper value limit, processing on packets carrying Stage values being 0 in a previous round is completed. A topology status of service nodes corresponding to a Stage value that becomes 0 again after the Stage value reaches the upper value limit in this round does not conflict with a topology status of service nodes corresponding to the Stage value being 0 in the previous round.

In the foregoing, the Stage value is considered as a constant to identify a topology status of service nodes at a specified time. The Stage value in this embodiment of the present application may also be indicated in other forms, such as a timestamp or a load balancing value.

Operation 101 may be a preferred operation for implementing an objective of the present application. The Stage value may be generated by another network element, which is also not limited in this embodiment of the present application. A manner for assigning a value to the Stage value is not limited to the foregoing described manner, as long as it is ensured that topology statuses of service nodes that correspond to same Stage values used at the same time are the same.

Operation 102: The Controller delivers the generated Stage value to a flow classification module (Flow Classifier).

Each time the Controller generates or updates a Stage value, the Controller delivers the Stage value to the flow classification module. The Controller can control at least one flow classification module at the same time, and each time after the Stage value is updated, delivers an updated Stage value to each controlled flow classification module.

Preferably, when a packet flow is generated, the Controller further delivers a service routing identifier (SID) of the packet flow to a flow classification module of the packet flow, where the service routing identifier is used to indicate a transmission path of the packet flow in a topology architecture of service nodes. In addition, the Controller further delivers the generated packet flow to the flow classification module, and requires the flow classification module to process a packet in the received packet flow.

Operation 103: The flow classification module adds the Stage value to packet headers of packets in a packet flow.

Preferably, the flow classification module further adds the SID to the packet headers of the packets in the packet flow.

After the flow classification module adds the Stage value to the packets, regardless of whether the Controller updates the Stage value, the Stage value that is already carried in the packets does not change any more. That is, the Stage value carried in the packets is a Stage value when the packet flow to which the packets belongs is generated; if the Stage value is updated later, an updated Stage value is added to a packet in a packet flow that is generated after the Stage value is updated, and the Stage value carried in the previously generated packets does not change.

For multiple packet flows aggregated to a same service flow, a status value carried in a packet in any packet flow identifies a topology status of service nodes when the packet flow is generated. If Stage values of multiple packet flows when the packet flows are generated are the same, Stage values carried in packets in the multiple packet flows are the same.

The foregoing operation 102 and operation 103 are preferred operations of this embodiment of the present application. The Stage value may be carried in the packets in another manner or by using another network device, which is not limited in this embodiment of the present application, and besides the Stage value, another parameter may be carried in the packets, which is also not limited in this embodiment of the present application.

Operation 104: The flow classification module successively guides the packets in the packet flow along a transmission path corresponding to the packets.

In one embodiment, in operation 104, the flow classification module successively guides the packets to a service node in the first hop on the transmission path of the packets, and a routing process of the packets starts.

Figure 2:
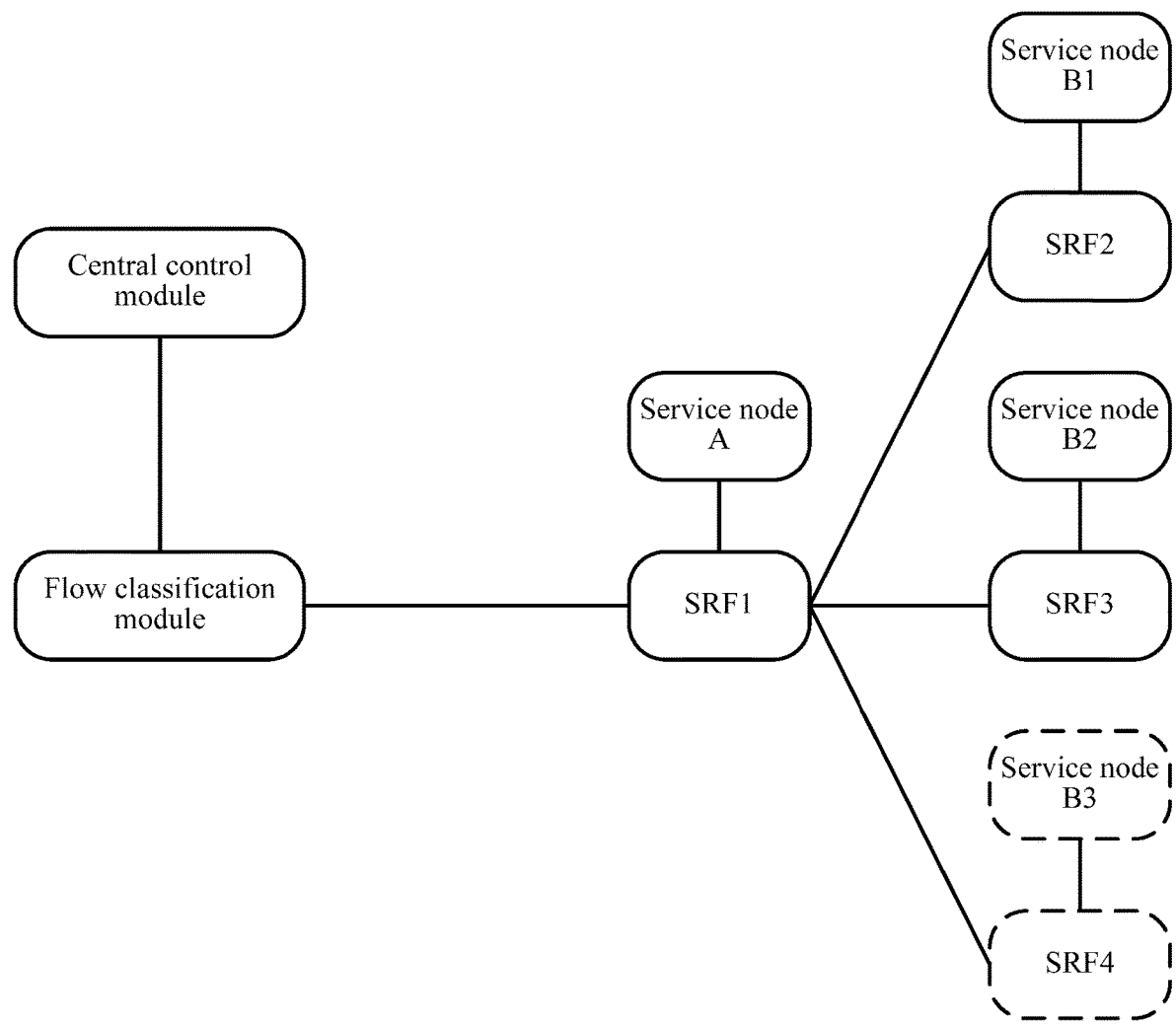
FIG. 2 is a schematic diagram of a topology architecture of service nodes according to one embodiment.

For any packet in the packet flow, the flow classification module transmits the packet to a service node in the first hop according to a transmission path of the packet; after the service node in the first hop processes the packet, the flow classification module transmits the packet to a service node in the second hop. The packet is transmitted to other hops in the same manner, until the packet is transmitted to a service node in the last hop. For ease of description, a topology architecture of service nodes shown in FIG. 2 is used as an example below, and an example in which a packet in a packet flow needs to pass through a service node A in the $N^{th}$ hop and pass through one service node of service nodes B1 to B2 in the $(N+1)^{th}$ hop is used for description. If processing on the packet is still not completed after the packet passes through the $(N+1)^{th}$ hop, a subsequent transmission process is similar to the process from the $N^{th}$ hop to the $(N+1)^{th}$ hop, and is not described herein again.

In one embodiment, if in operation 104, the flow classification module determines, according to the SID in the packets, that there are multiple service nodes in the first hop through which the packet flow passes, a service node in the first hop may be selected in the following manner, and the packets are transmitted to the selected service node in the first hop.

Operation 105: A load balancing module to which a service node A in the $N^{th}$ hop is attached receives a packet.

The load balancing module may be a network element, such as a service routing function (SRF), that is independent of the service node attached to the load balancing module, and the SRF may be implemented by using a physical entity, or may be implemented by using software through integration. The load balancing module may also be a network element that is integrated with the service node attached to the load balancing module, and appear in a virtual machine form. For ease of subsequent description, description is provided by using an example in which the load balancing module is an SRF.

Herein, a network functions virtualization (NFV) technology can be used to distinguish the service node and the load balancing module, that is, service nodes that are originally deployed in a network or other more nodes such as a switch and a router that have a network function are implemented by using a common computing platform. In this way, operation and maintenance of nodes are uniformized, and a software function and a hardware device are separated, which can separately provide better scalability for software and hardware.

In operation 105, the packet received by the SRF1 to which the service node A is attached may be a packet sent by an SRF in a previous hop, and if the service node A is a service node in the first hop, the packet received by the SRF1 is a packet sent by the flow classification module.

Operation 106: The SRF1 performs a service routing forwarding operation on the packet, and sends the packet to the service node A.

Operation 107: After performing processing (for example, firewall processing) on the packet, the service node A returns the packet to the SRF1.

Operation 108: The SRF1 searches for a service node of a next hop according to an SID in the packet, and if there are multiple service nodes in the next hop, operation 109 is performed; if there is only one service node, the packet is directly transmitted to an SRF to which the service node of the next hop is attached.

Each SRF may prestore related information of an SRF to which an adjacent service node is attached, which is referred to as a load balancing table. As shown in Table 1, Table 1 is a load balancing table, which is stored in the SRF 1, for the next hop.

TABLE 1

| Service routing identifier | Target service node | Operation value | Routing address of an SRF to which a service node is attached |
| --- | --- | --- | --- |
| SID_1 | Service node B1 | 0 | Routing address of an SRF2 |
|  | Service node B2 | 1 | Routing address of an SRF3 |

The SRF1 can find from Table 1 that there are two service nodes in the $(N+1)^{th}$ hop, where one service node (that is, the service node B1 in FIG. 2) is attached to the SRF2 and the other service node (that is, the service node B2 in FIG. 2) is attached to the SRF3, and one service node needs to be selected from the two service nodes as a service node in the next hop.

Each time a topology status of service nodes changes, for example, a quantity of service nodes is increased or decreased, the load balancing table stored in the SRF is correspondingly updated, so that an updated load balancing table can reflect actual service nodes in the next hop and related information of the SRF to which the service node is attached. Assuming that in the topology status of a service structure shown in FIG. 2, a service node B3 (a portion indicated by using dashed lines in FIG. 2) attached to an SRF4 is newly added, Table 1 is updated to content shown in Table 2.

TABLE 2

| Service routing identifier | Target service node | Operation value | Routing address of an SRF to which a service node is attached |
| --- | --- | --- | --- |
| SID_1 | Service node B1 | 0 | Routing address of an SRF2 |
|  | Service node B2 | 1 | Routing address of an SRF3 |
|  | Service node B3 | 2 | Routing address of an SRF4 |

Operation 109: The SRF1 determines, according to the Stage value carried in the packet, service nodes that are identified by the Stage value at a specified time in the next hop.

From operation 103 in which the packets carry the Stage value to operation 109, regardless of whether the topology status of the service nodes in the $(N+1)^{th}$ hop already changes, the SRF1 does not use a current topology status of the service nodes, but uses the topology status in the next hop in operation 103, which avoids a case in which a transmission path of a packet in a same packet flow changes because a topology status of service nodes changes.

For example, when the packets carry the Stage value in operation 103, for service nodes in the $(N+1)^{th}$ hop, there are the service node B1 and the service node B2; then the packets in the packet flow are successively routed. When the first n packets are routed to the $(N+1)^{th}$ hop, a topology status of service nodes in the $(N+1)^{th}$ hop does not change; before the $(n+1)^{th}$ packet is routed to the $(N+1)^{th}$ hop, the service node B3 (as shown in a dashed line portion in FIG. 2) is added in the $(N+1)^{th}$ hop; therefore, when the $(n+1)^{th}$ packet is routed from the $N^{th}$ hop to the $(N+1)^{th}$ hop, the SRF1 does not determine that the service node B1, the service node B2, and the service node B3 actually exist currently, but determines, according to the Stage value carried in the packet, that the service node B1 and the service node B2 are in the $(N+1)^{th}$ hop when the Stage value is carried, and selects, from the service node B1 and the service node B2, a service node through which the packet passes.

Operation 110: The SRF1 selects one service node from the service nodes that are identified by the Stage value in the next hop.

In operation 110, the SRF1 achieves, by selecting an SRF to which a service node is attached or a port of an SRF to which a service node is attached, an objective of selecting the service node.

Operation 111: The SRF1 sends the packet to the selected service node.

Assuming that the SRF1 selects the SRF2 in operation 110, the SRF1 sends the packet to the SRF2, and the SRF2 sends the packet to the locally attached service node B1, thereby implementing the process in which the packet is transmitted from the $N^{th}$ hop to the $(N+1)^{th}$ hop.

According to the solution in this embodiment of the application, regardless of how a topology status of service nodes changes, it can be ensured that packets in a same packet flow pass through a same service node in each hop; therefore, a problem of missequencing of the packets in the same packet flow can be effectively avoided, and a service node having a status recording requirement can record a status of each packet in the same packet flow.

Figure 3:
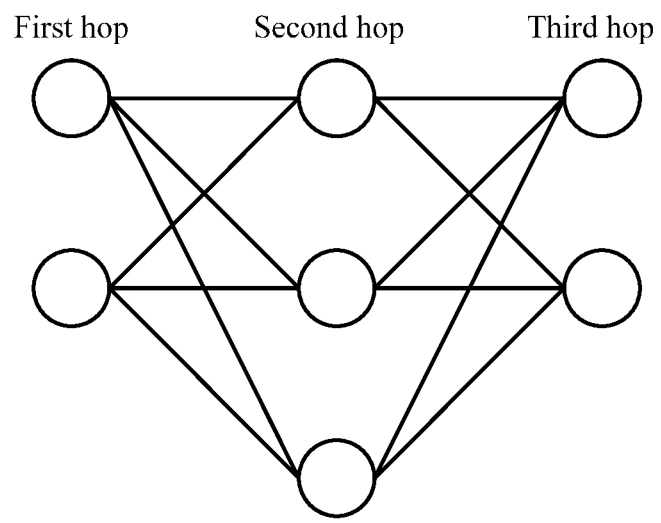
FIG. 3 is a schematic diagram of load balancing between service nodes by using service nodes in three hops as an example.

Preferably, as shown in FIG. 3, service nodes in three hops are used as an example, to describe a routing status between service nodes when load is relatively balanced. In order to further implement load balancing between service nodes based on the solution in Embodiment 1, especially in order that when a topology status of service nodes changes dynamically, a packet flow can be basically equally divided into service nodes in a same hop, an embodiment of the present application further provides a load balancing operation solution, and descriptions are provided below in Embodiment 2.

Embodiment 2

Based on the method described in Embodiment 1, a load balancing operation can be used in operation 110 of the method.

Figure 4:
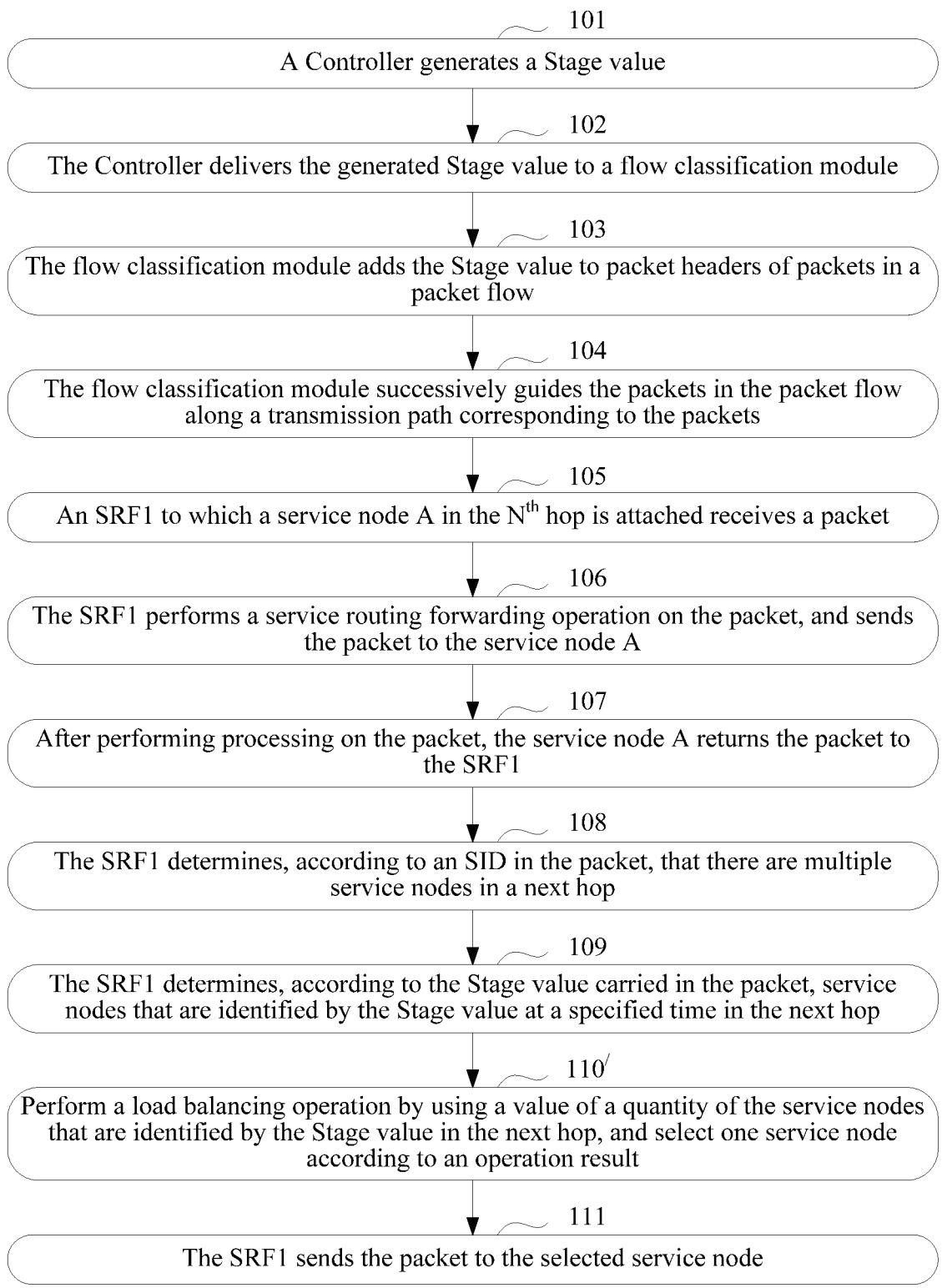
FIG. 4 is a schematic diagram of operations of a packet processing method according to one embodiment.

As shown in FIG. 4, FIG. 4 is a schematic diagram of operations of a packet processing method. Except operation 110', other operations are the same as those in FIG. 1. In operation 110' in FIG. 4, based on operation 110 in FIG. 1, one service node is selected from the service nodes of the next hop by using a load balancing operation. A process of the load balancing operation is as follows:

Operation 110': Perform a load balancing operation by using a value of a quantity of the service nodes that are identified by Stage value in the next hop, and select one service node according to an operation result.

It is assumed that in an execution process of Embodiment 1, the topology status of the service nodes does not change, that is, it is determined according to the Stage value that service nodes in the next hop are the service node B1 and the service node B2, and a quantity of the service nodes is count=2. The load balancing operation may be performed by using a hash algorithm. A feasible manner for the load balancing operation is: performing a modulo operation on a predetermined value and the value of the quantity count=2 of the service nodes that are identified by the Stage value in the next hop, and selecting one service node as a next-hop service node according to a modulo operation result. An implementation process is as follows:

First, a modulo operation is performed on the predetermined value and count=2, and the modulo operation result is 0 or 1.

Next, operation values that separately correspond to the service nodes (that is, the service node B1 and the service node B2) identified by the Stage value in the next hop are determined.

Then, matching is performed between the modulo operation result and the operation values of the service nodes, and a service node corresponding to an operation value matching the modulo operation result is selected.

The case shown in FIG. 2 is still used as an example. If the modulo operation result is 0, the service node B1 is selected according to the operation values recorded in Table 1, and then the packet is transmitted, according to the routing addresses of the SRFs to which the service nodes recorded in Table 1 are attached, to the SRF2 to which the service node B1 is attached; if the modulo operation result is 1, the service node B2 is selected according to the operation values recorded in Table 1, and then the packet is transmitted, according to the routing addresses of the SRFs to which the service nodes recorded in Table 1 are attached, to the SRF3 to which the service node B2 is attached.

Particularly, if a case in which multiple service nodes are attached to a same SRF exists, processing is performed in the following manner:

Assuming that when the topology status of the service nodes does not change, it is determined according to the Stage value that service nodes in the next hop are the service node B1, the service node B2, and the service node B3, where the service node B1 is attached to the SRF2, and the service node B2 and the service node B3 are both attached to the SRF3, a load balancing table stored in the SRF1 is shown in Table 3:

TABLE 3

| Service routing identifier | Target service node | Operation value | Routing address of an SRF to which a service node is attached |
|---|---|---|---|
| SID_1 | Service node B1 | 0 | Routing address of an SRF2 |
|  | Service node B2 | 1 | Routing address of an SRF3 |
|  | Service node B3 | 2 | Routing address of an SRF3 |

In addition, the SRFs in the next hop also record identifiers and operation values of the service nodes and routing addresses of the SRFs to which the service nodes are attached. Content recorded in the SRF3 is used as an example, and the SRF3 records the following content: identifiers of the service nodes in this hop, operation values of the service nodes, and routing address of the SRFs to which the service nodes are attached. In addition, the SRF3 further records a port number (it is assumed that the port number is port number 1) of a communications port through which the service node B2 communicates with the SRF3, and a port number (it is assumed that the port number is port number 2) of a communications port through which the service node B3 communicates with the SRF3.

A process in which the SRF1 selects a service node in the next hop is:

the SRF1 determines that the quantity of the service nodes in the next hop is count=3, performs a modulo operation on the predetermined value and 3, and queries Table 3 according to a modulo operation result; assuming that the modulo operation result is 1, and the SRF3 is selected by querying Table 3, the selected service node is the service node B2; after the SRF1 transmits the packet to the SRF3, the SRF3 performs a modulo operation in a manner that is the same as that used by the SRF1, and a calculated modulo operation result is also 1; the SRF3 queries locally recorded operation values of the service nodes, and can also determine that the SRF1 selects the service node B2; therefore, the SRF3 transmits the packet to the service node through a corresponding port according to a port number (it is assumed that the port number is port number 1) of a communications port between the SRF3 and the service node B2.

Descriptions are provided above by using an example in which the topology status of the service nodes does not change. If the topology status of the service nodes changes, for example, when the service node B3 attached to the SRF4 is added, after the SRF1 determines according to the Stage value that the service nodes in the next hop are the service node B1 and the service node B2, the foregoing operation is still performed according to count=2, and one service node is selected as the next-hop service node from the service node B1 and the service node B2.

The predetermined value may be a value that is generated by the Controller and delivered to the flow classification module, and is added by the flow classification module to the packet in operation 103. In this case, the predetermined value can be referred to as a TCN (traffic classify number), and TCNs carried in packets in a same packet flow are the same. The TCN that is generated by the Controller and delivered to the flow classification module may be: a value randomly selected from a resource pool, or a value obtained by converting a transmission parameter shared by all packets in a service flow in which the packet is located, or a value selected according to a load status of a service node.

Multiple values that can be used as TCNs are buffered in the resource pool in advance, and a value range of the TCNs may be [1, N], where N is a positive integer. A manner for determining a lower value limit $N_{min}$ of the N value may be: first determining a maximum value of service nodes that have a same network service function and that are in a hop through which the packet passes, and using M (M is greater than 1, and in one embodiment, M is equal to 100) times the maximum value as $N_{min}$. For example, there is a service node A in the first service hop through which the packet needs to pass, there are three service nodes (which are a service node B1, a service node B2, and a service node B3) in the second service hop, and there are two service nodes (which are a service node C1 and a service node C2) in the third service hop. In this case, in the first hop, a maximum value of service nodes having a same network service function is 3, and if M is equal to 100, $N_{min}$ in the resource pool is 300. In this case, the TCN value in the resource pool may be a positive integer from 1 to 300.

The predetermined value may not be carried in the packet, and is obtained by converting, by the SRF, the transmission parameter shared by all the packets in the service flow in which the packet is located.

The transmission parameter shared by the packets includes, but is not limited to: a source IP address, a destination IP address, a protocol number, a source port number at a transmission layer, and a destination port number at a transmission layer of the packets. A value obtained after a hash operation is performed on the transmission parameter can be used as the predetermined value. An example in which a destination IP address of the packets is 200.1.1.154 is used, and the destination IP address 200.1.1.154 may be converted into a hash value by using the hash algorithm, for example, 200.1.1.154 is converted into 200+1+1+154=356 that is used as the predetermined value.

Operations for selecting a service node in the next hop for the packet by the SRF1 in Embodiment 2 of the present application are described below by using the topology status of the service nodes in FIG. 2 as an example:

Case 1: Assuming that the packet carries a TCN=320, the SRF1 determines count=2 according to the Stage value, performs a modulo operation on 320 and 2, where an obtained result is 0, queries Table 1 for the operation values, and determines to select the service node B1 in the next hop.

Case 2: Assuming that the packet does not carry the TCN, the SRF1 converts the destination IP address 200.1.1.154 of the packet into 200+1+1+154=356, determines count=2 according to the Stage value, performs a modulo operation on 356 and 2, where an obtained result is 0, queries Table 1 for the operation values, and determines to select the service node B1 in the next hop.

Case 3: Assuming that the packet does not carry the TCN, the SRF1 converts the destination IP address 200.1.1.154 of the packet into 200+1+1+154=356, determines count=3 according to the Stage value (it is assumed that the packet is a packet in a packet flow generated after the topology status of the service nodes is updated), performs a modulo operation on 356 and 3, where an obtained result is 2, queries Table 2 for the operation values, and determines to select the service node B3 in the next hop.

Compared with the manner in which the SRF obtains the predetermined value by converting the transmission parameter of the packets according to the hash algorithm each time, the manner in which the SRF directly acquires the TCN from the packet has the following advantages:

1) some service nodes change packet headers, for example, a packet header is changed after being processed by a NAT node; a value obtained through calculation by using the hash algorithm may interfere with distribution of packet flows between service nodes, while a pre-specified TCN can ensure that packet flows are evenly distributed between service nodes, and manifestation of load balancing is completely decoupled from service processing;

2) if a service node is located in a virtual network (that is, applied in the NFV technology), a completely new packet format may be introduced, and therefore, a service node that is already deployed currently cannot identify a packet in a new format, and it is difficult to obtain a good hash calculation method to implement load balancing, while TCNs may not rely on a packet characteristic, and are distributed completely evenly, and a good load balancing effect is achieved; and 3) if a hash operation is performed hop by hop and packet by packet, packet processing performance of a service node is affected, and the hash operation needs to be synchronized in multiple points, causing an increase in maintenance costs.

According to the solution of Embodiment 2 of the present application, a large quantity of packet flows may further be normalized into a fixed quantity of aggregated flows, predetermined values of packets in each packet flow in the aggregated flows are the same, and the predetermined values of the packets do not change any longer; after a load balancing operation in Embodiment 2 is used, if Stage values carried in the packets in the packet flows in the aggregated flows are the same, all the aggregated flows pass through a same service node; if a case in which Stage values of packets in at least two packet flows are different exist, the packet flows in the aggregated flows regularly pass through different service nodes according to the foregoing hash operation rule. Therefore, when the packet flows are relatively stable, load balancing between service nodes in a same hop can be statistically implemented as long as a predetermined value is properly determined for a packet.

The solution of Embodiment 2 of the present invention is a preferred manner for implementing Embodiment 1. However, a service node in a next hop may be selected for a packet in another manner, which is not limited in embodiments of the present application.

Preferably, based on the described solutions of Embodiment 1 or Embodiment 2, a packet flow on which routing is performed is considered as a forward flow, and if a transmission path of a backward flow corresponding to the forward flow is a reverse process of a transmission path of the forward flow, the forward and backward service flows can use the same routing path. Therefore, if in a routing process of the forward flow, missequencing of packets in a same packet flow can be avoided, a packet status recording requirement of a service node can be met, and load balancing between service nodes in a same hop can be implemented, the foregoing effects can also be achieved for the backward flow. A bidirectional routing process of a packet flow is described below in Embodiment 3.

Embodiment 3

Figure 5:
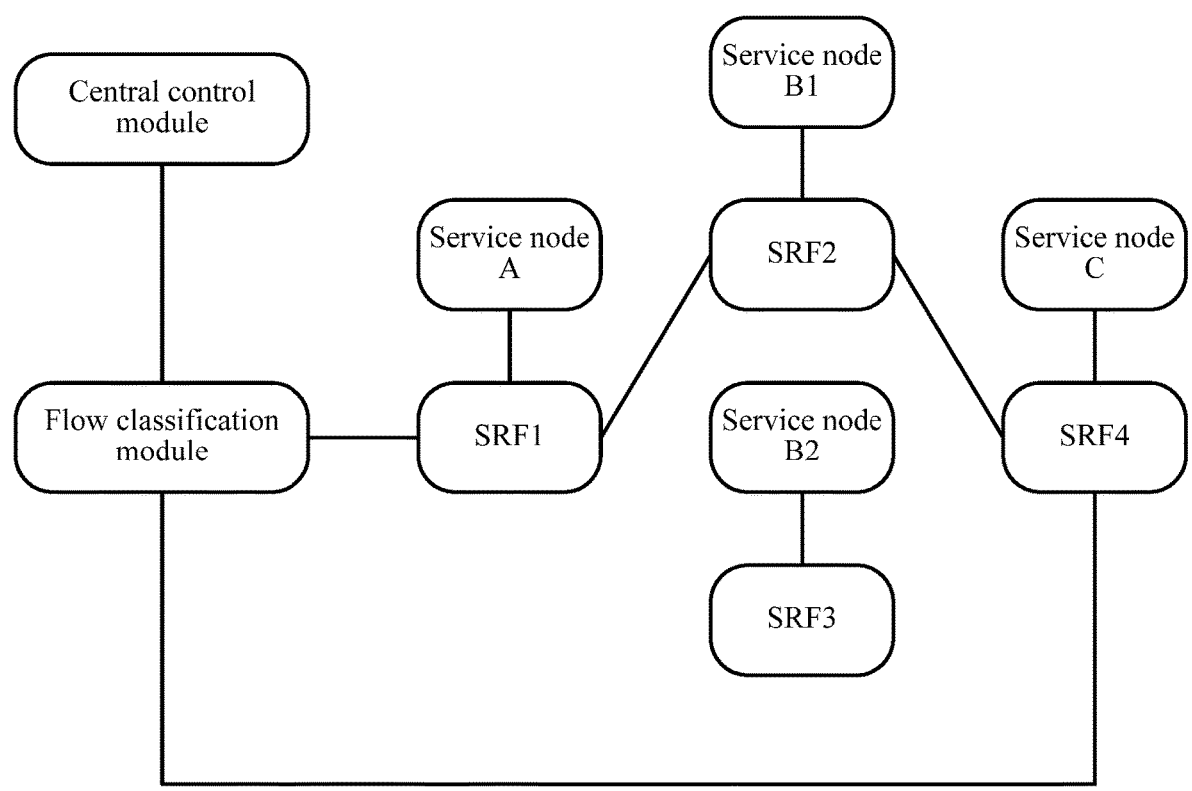
FIG. 5 is a schematic diagram of a topology architecture of service nodes according to one embodiment.

A packet is processed in Embodiment 3 of the present application based on Embodiment 1 and Embodiment 2, so as to achieve an objective of a bidirectional flow routing process. A topology status of service nodes shown in FIG. 5 is used as an example. Assuming that a sequence in which a forward flow passes through service nodes is A-B1-C, a sequence in which a backward flow flow-r passes through service nodes is C-B1-A. In this way, the forward and backward flows can use the same routing path.

Figure 6:
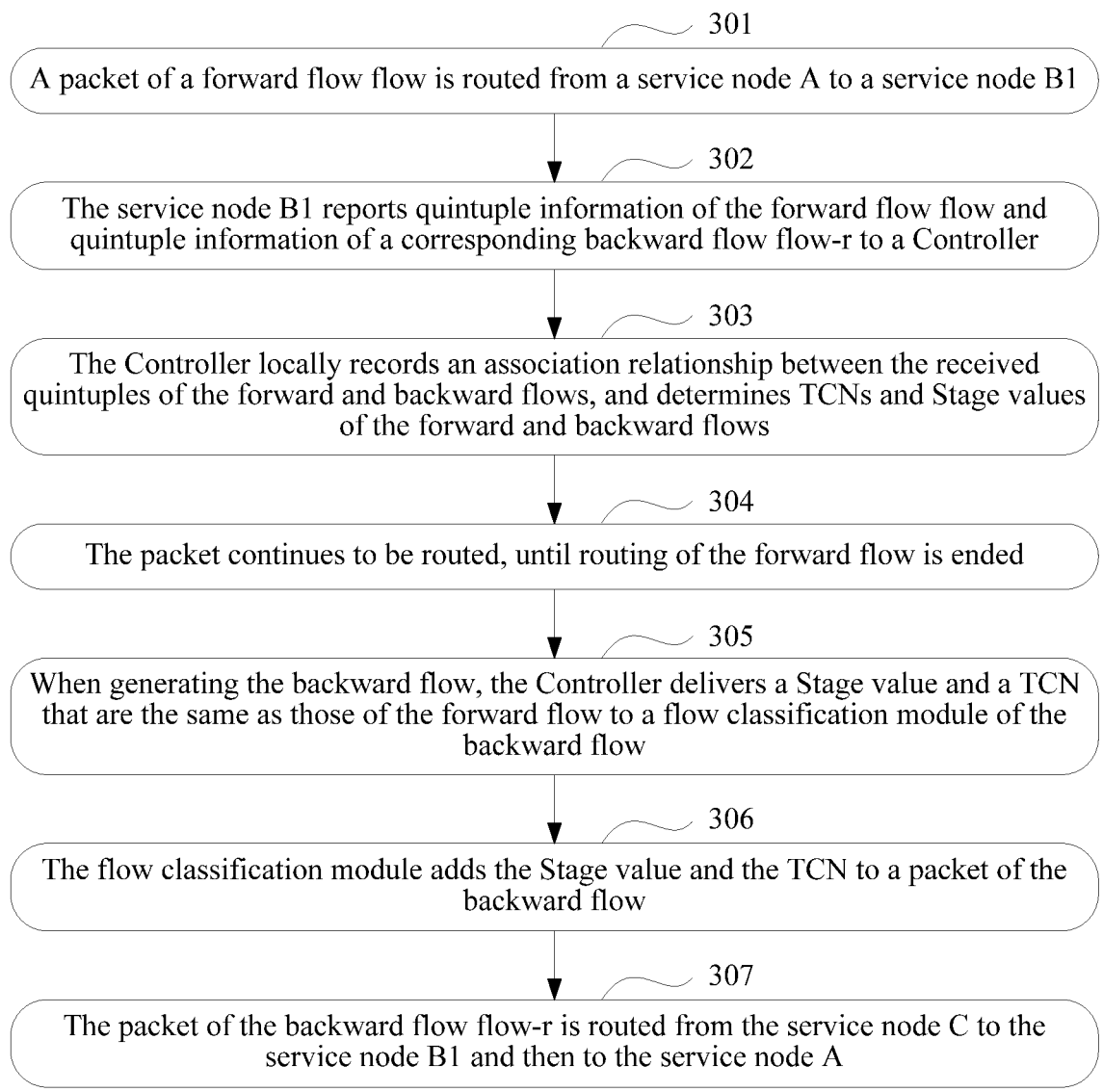
FIG. 6 is a schematic diagram of operations of a packet processing method according to one embodiment.

As shown in FIG. 6, operations in Embodiment 3 are as follows:

Operation 301: A packet of a forward flow is routed from a service node A to a service node B1.

An implementation manner of operation 301 is the same as the implementation manners of the solutions of Embodiment 1 and Embodiment 2. It is assumed that a Controller delivers a Stage value being 0, a TCN=24, and an SID=1001 to a flow classification module of the forward flow, a source IP address is an IP address 10.10.1.1 of the service node A, a destination IP address is an IP address 10.10.1.4 of the service node C, and a load balancing table stored in an SRF1 is shown in Table 4.

TABLE 4

| Service routing identifier | Target service node | Operation value | Routing address of an SRF to which a service node is attached |
|---|---|---|---|
| 1001 | Service node B1 | 0 | 10.10.1.2 |
| 1001 | Service node B2 | 1 | 10.10.1.3 |

It should be noted that, if the packet does not carry a TCN, the solution of this embodiment does not involve the TCN either, and when a service node in a next hop is selected, a predetermined value can be obtained by converting a transmission parameter shared by all packets in a service flow in which the packet is located.

Operation 302: The service node B1 reports quintuple information of the forward flow and quintuple information of a corresponding backward flow flow-r to a Controller.

Because a packet flow can be uniquely indicated by using quintuple information of the packet flow, the service node B1 reports the quintuple information of the forward flow and the backward flow flow-r to the Controller, and the Controller can identify the forward and backward flows that need to use the same routing path.

In one embodiment, the service node B1 may further report a node identifier of the service node B1 to the Controller, so that the Controller learns of the service node that has a requirement that the forward and backward flows use the same routing path.

In the solution of this embodiment, the packet may pass through multiple service nodes, not all service nodes receiving the packet need to report the quintuple information of the forward and backward flows to the Controller, and a service node that have a requirement that the forward and backward flows use the same routing path, for example, a service node that has a packet status recording requirement, may report the quintuple information to the Controller.

Operation 303: The Controller locally records an association relationship between received quintuples of the forward and backward flows, and determines, according to a TCN and a Stage value that are previously delivered to a flow classification module, that TCNs of the forward and backward flows=24 and Stage values are 0.

Operation 304: The packet continues to be routed, until routing of the forward flow is ended.

Operation 305: When generating the backward flow that matches the locally recorded quintuple information of the backward flow, the Controller delivers a Stage value and a TCN that are the same as those of the forward flow to a flow classification module of the backward flow.

In operation 305, the Stage value delivered by the Controller is 0, TCN=24, SID=1002, a source IP address is an IP address 10.10.1.4 of the service node C, a destination address is an IP address 10.10.1.1 of the service node A, and a load balancing table stored in an SRF4 is shown in Table 5.

TABLE 5

| Service routing identifier | Target service node | Operation value | Routing address of an SRF to which a service node is attached |
|---|---|---|---|
| 1002 | Service node B1 | 0 | 10.10.1.2 |
| 1002 | Service node B2 | 1 | 10.10.1.3 |

In the solution of Embodiment 3, the flow classification module of the forward flow and the flow classification module of the backward flow may be a same network element, or may be different network elements. A form of a flow classification module is not limited in this embodiment of the present application, as long as it is ensured that all flow classification modules have a capability of communicating with the Controller.

Operation 306: The flow classification module adds the Stage value and the TCN to a packet of the backward flow.

Operation 307: The packet of the backward flow flow-r is routed from the service node C to the service node B1 and then to the service node A.

Because the Stage value and the TCN that are carried in the packet of the backward flow are the same as those in the forward flow, when the packet of the backward flow is processed according to the solution of Embodiment 1 in the topology status of the service nodes shown in FIG. 5, it is ensured that routing is performed according to the sequence of C-B1-A, and that the backward flow and the forward flow use the same routing path.

According to the solution of this embodiment of the present application, a newly generated packet flow and an old packet flow are distinguished by using a Stage value on a control plane; the old packet flow is not diverted when a topology status of service nodes changes, and the new packet flow is steered according to a topology status of service nodes after the change. In this way, it is ensured that packets in a same packet flow are not diverted, smooth transition of load balancing after a topology status of service nodes changes is implemented; complexity of load balancing between service nodes does not increase as a quantity of packet flows increases, and scalability is strong.

Embodiment 4

Figure 7:
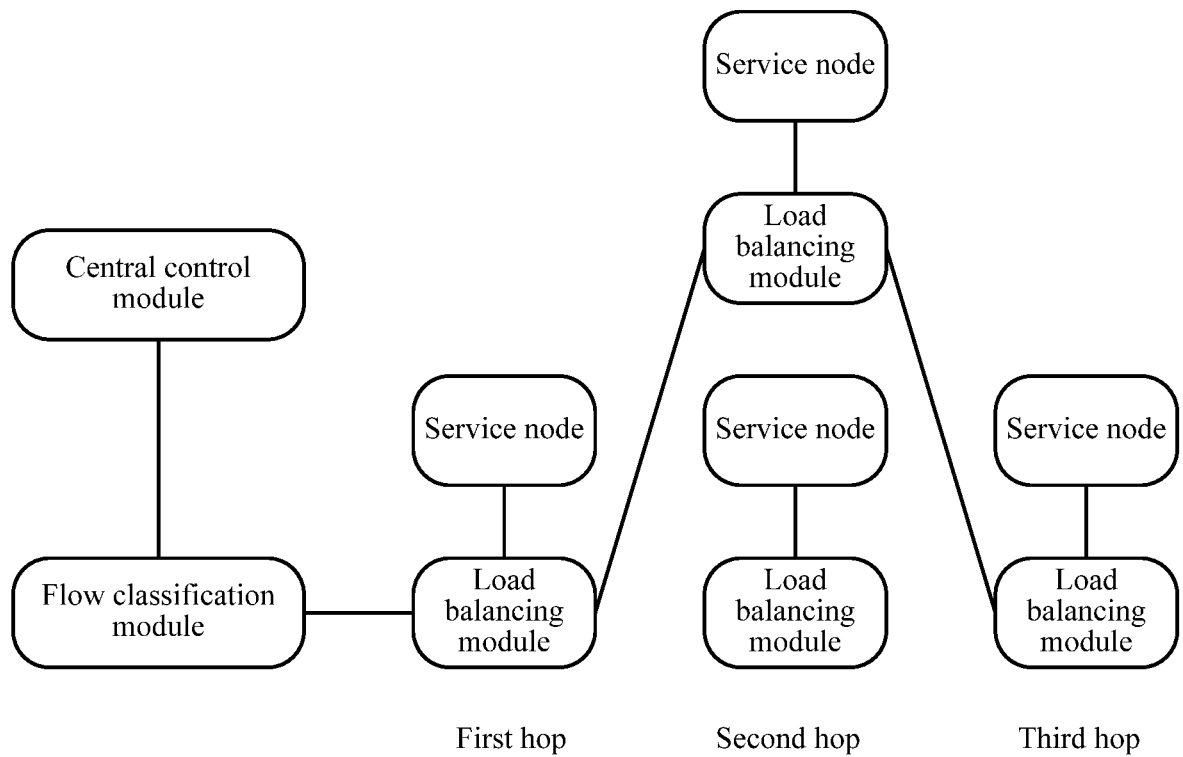
FIG. 7 is a schematic structural diagram of a packet processing system according to one embodiment.

Embodiment 4 of the present application describes a packet processing system belonging to an inventive concept that is the same other embodiments. As shown in FIG. 7, service nodes in three hops are used as an example, and the system includes a load balancing device and a service node attached to the load balancing device, where the load balancing device is configured to: when determining that there are multiple service nodes in a next hop of a packet, determine, according to a status value that is carried in the packet and that is used to identify a topology status of service nodes at a specified time, service nodes that are identified by the status value in the next hop; and select one service node from the service nodes that are identified by the status value in the next hop, and send the packet to the selected service node, where status values carried in all packets in a same packet flow are the same; and the service node is configured to receive the packet.

The load balancing device may be a network element, such as an SRF, that is independent of the service node attached to the load balancing device, and the SRF may be implemented by using a physical entity, or may be implemented by using software through integration. The load balancing device may also be a network element that is integrated with the service node attached to the load balancing device, and appear in a virtual machine form.

The service node refers to a network device, such as a firewall or a switch, that can perform service processing on a packet.

In one embodiment, for multiple packet flows aggregated to a same service flow, a status value carried in a packet in any packet flow identifies a topology status of service nodes when the packet flow is generated.

In one embodiment, the topology status of the service nodes includes a quantity of service nodes of a same service.

In one embodiment, the system further includes a central control device and a flow classification device, where the central control device is configured to generate the status value and deliver the status value to the flow classification device; and the flow classification device is configured to add the status value to a packet of a currently generated packet flow.

In one embodiment, the central control device is further configured to monitor a topology status of service nodes, update the status value when the topology status of the service nodes changes, and send an updated status value to the flow classification device; and the flow classification device is further configured to add the updated status value to a packet of a currently generated packet flow.

In one embodiment, the load balancing device is configured to perform a load balancing operation by using a value of a quantity of the service nodes that are identified by the status value in the next hop, and select one service node according to an operation result.

In one embodiment, the load balancing device is configured to perform a modulo operation on a predetermined value and the value of the quantity of the service nodes that are identified by the status value in the next hop, and select one service node as a next-hop service node according to a modulo operation result.

In one embodiment, the load balancing device is configured to perform a modulo operation on the predetermined value and the value of the quantity of the service nodes that are identified by the status value in the next hop, perform, according to operation values corresponding to the service nodes that are identified by the status value in the next hop, matching between the modulo operation result and the operation values, select a service node corresponding to an operation value matching the modulo operation result, and send the packet to a load balancing device to which the selected service node is attached;

the service node is configured to receive the packet sent by a load balancing device to which the service node is attached.

In one embodiment, the load balancing device is configured to acquire the carried predetermined value from the packet, or obtain the predetermined value by converting a transmission parameter shared by all packets in a service flow in which the packet is located.

In one embodiment, the central control device is further configured to deliver the predetermined value to the flow classification device; and the flow classification device is further configured to add the predetermined value to the packet.

In one embodiment, the central control device is configured to use, as the predetermined value, a value randomly selected from a resource pool, or a value obtained by converting the transmission parameter shared by all the packets in the service flow in which the packet is located, or a value selected according to a load status of a service node, and deliver the predetermined value to the flow classification device.

In one embodiment, the service node is further configured to report quintuple information of the packet flow in which the packet is located and quintuple information of a corresponding backward flow to the central control device;

the central control device is configured to: when it is determined according to the quintuple information of the backward flow that the backward flow is generated, deliver, to the flow classification device, the status value carried in the packet in the packet flow; and the flow classification device is configured to add the status value to a packet of the backward flow, so that the packet of the backward flow is processed in a topology architecture of the service nodes identified by the status value.

In one embodiment, the central control device is further configured to: when the packet received by the service node carries the predetermined value, when it is determined that the backward flow is generated, deliver the predetermined value to the flow classification device; and the flow classification device is further configured to add the predetermined value to the packet of the backward flow.

Embodiment 5

Figure 8A:
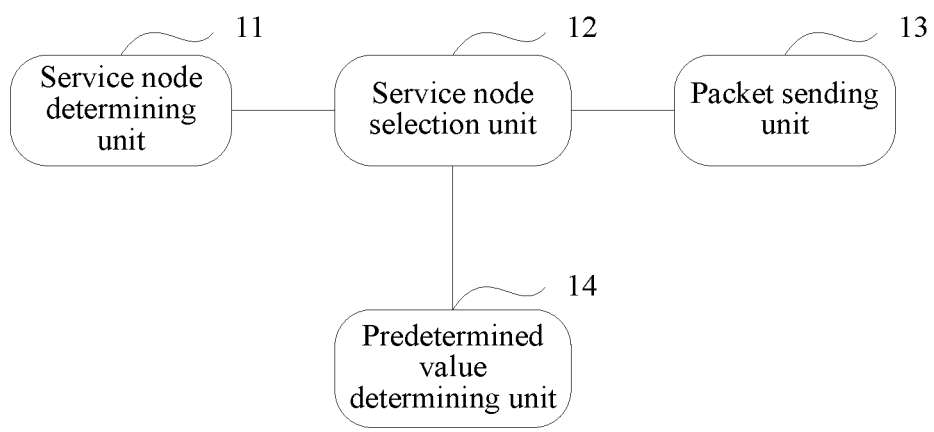
FIG. 8($a$) and FIG. 8($b$) are a schematic structural diagram of a load balancing device according one embodiment.

Embodiment 5 of the present application describes a load balancing device belonging to an inventive concept that is the same as those of the other embodiments. As shown in FIG. 8(a), the load balancing device includes a service node determining unit 11, a service node selection unit 12, and a packet sending unit 13, where the service node determining unit 11 is configured to: when determining that there are multiple service nodes in a next hop of a packet, determine, according to a status value that is carried in the packet and that is used to identify a topology status of service nodes at a specified time, service nodes that are identified by the status value in the next hop, where status values carried in all packets in a same packet flow are the same;

the service node selection unit 12 is configured to select one service node from the service nodes that are identified by the status value in the next hop; and the packet sending unit 13 is configured to send the packet to the selected service node.

In one embodiment, for multiple packet flows aggregated to a same service flow, a status value carried in a packet in any packet flow identifies a topology status of service nodes when the packet flow is generated.

In one embodiment, the topology status of the service nodes includes a quantity of service nodes of a same service.

In one embodiment, the service node selection unit 12 is configured to perform a load balancing operation by using a value of a quantity of the service nodes that are identified by the status value in the next hop, and select one service node according to an operation result.

In one embodiment, the service node selection unit 12 is configured to perform a modulo operation on a predetermined value and the value of the quantity of the service nodes that are identified by the status value in the next hop, and select one service node as a next-hop service node according to a modulo operation result.

In one embodiment, the service node selection unit 12 is configured to perform a modulo operation on the predetermined value and the value of the quantity of the service nodes that are identified by the status value in the next hop, perform, according to operation values corresponding to the service nodes that are identified by the status value in the next hop, matching between the modulo operation result and the operation values, and select a service node corresponding to an operation value matching the modulo operation result; and the packet sending unit 13 is configured to send the packet to a load balancing device to which the selected service node is attached.

In one embodiment, the load balancing device further includes a predetermined value determining unit 14, configured to acquire the carried predetermined value from the packet, or obtain the predetermined value by converting a transmission parameter shared by all packets in a service flow in which the packet is located.

Figure 8B:
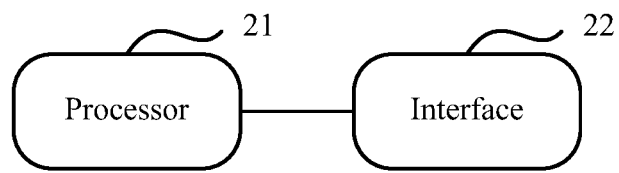

Embodiment 5 of the present application further describes another load balancing device belonging to an inventive concept that is the same as those of other embodiments. As shown in FIG. 8(*b*), the load balancing device includes a processor 21 and an interface 22, where the processor 21 is configured to: when determining that there are multiple service nodes in a next hop of a packet, determine, according to a status value that is carried in the packet and that is used to identify a topology status of service nodes at a specified time, service nodes that are identified by the status value in the next hop, where status values carried in all packets in a same packet flow are the same; and select one service node from the service nodes that are identified by the status value in the next hop; and the interface 22 is configured to send the packet to the selected service node.

In one embodiment, for multiple packet flows aggregated to a same service flow, a status value carried in a packet in any packet flow identifies a topology status of service nodes when the packet flow is generated.

In one embodiment, the topology status of the service nodes includes a quantity of service nodes of a same service.

In one embodiment, the processor 21 is configured to perform a load balancing operation by using a value of a quantity of the service nodes that are identified by the status value in the next hop, and select one service node according to an operation result.

In one embodiment, the processor 21 is configured to perform a modulo operation on a predetermined value and the value of the quantity of the service nodes that are identified by the status value in the next hop, and select one service node as a next-hop service node according to a modulo operation result.

In one embodiment, the processor 21 is configured to perform a modulo operation on the predetermined value and the value of the quantity of the service nodes that are identified by the status value in the next hop, perform, according to operation values corresponding to the service nodes that are identified by the status value in the next hop, matching between the modulo operation result and the operation values, and select a service node corresponding to an operation value matching the modulo operation result; and the interface 22 is configured to send the packet to a load balancing device to which the selected service node is attached.

In one embodiment, the processor 21 is configured to acquire the carried predetermined value from the packet, or obtain the predetermined value by converting a transmission parameter shared by all packets in a service flow in which the packet is located.

Embodiment 6

Figure 9:
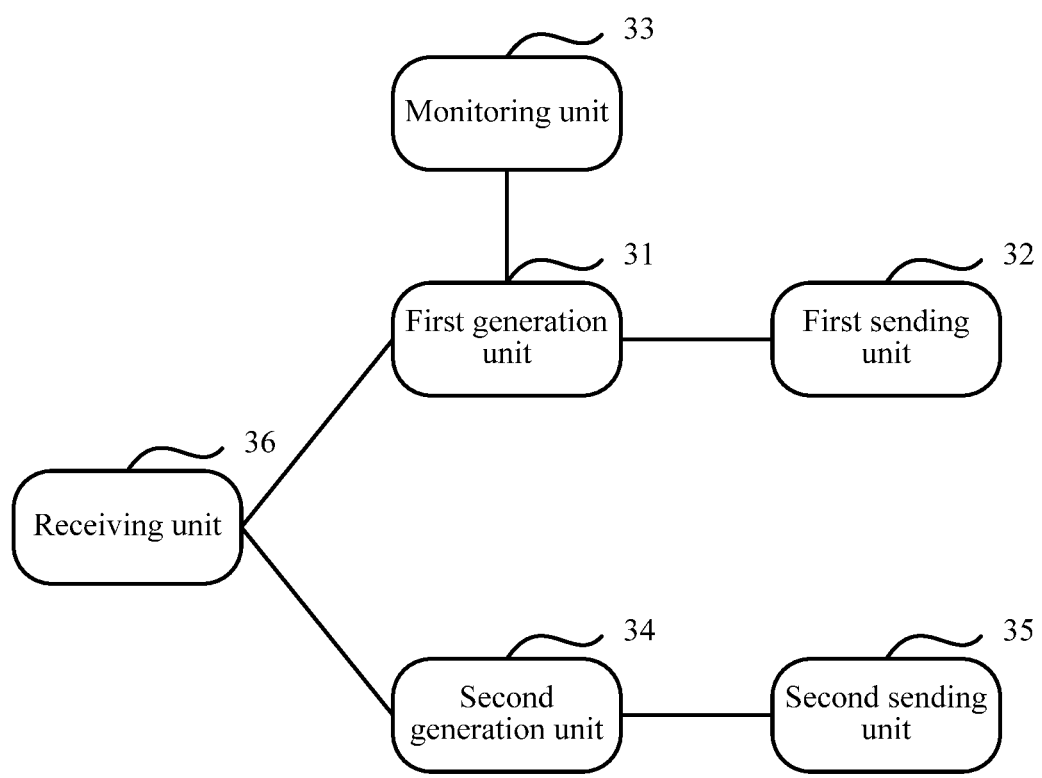
FIG. 9 is a schematic structural diagram of a central control device according to one embodiment.

Embodiment 6 of the present application describes a central control device. As shown in FIG. 9, the central control device includes a first generation unit 31 and a first sending unit 32, where the first generation unit 31 is configured to generate a status value; and a first sending unit 32 is configured to send the status value to a flow classification device, and instruct the flow classification device to add the status value to a packet.

In one embodiment, the central control device further includes a monitoring unit 33, configured to monitor a topology status of service nodes;

the first generation unit 31 is further configured to update the status value when the topology status of the service nodes changes; and the first sending unit 32 is further configured to send an updated status value to the flow classification device, where the flow classification device adds the updated status value to a packet of a currently generated packet flow.

In one embodiment, the central control device further includes:

a second generation unit 34, configured to generate a predetermined value for the packet; and a second sending unit 35, configured to send the predetermined value to the flow classification device, where the flow classification device adds the predetermined value to the packet.

In one embodiment, the second generation unit 34 is configured to use, as the predetermined value, a value randomly selected from a resource pool, or a value obtained by converting a transmission parameter shared by all packets in a service flow in which the packet is located, or a value selected according to a load status of a service node.

In one embodiment, the central control device further includes:

a receiving unit 36, configured to receive quintuple information of the packet flow in which the packet is located and quintuple information of a corresponding backward flow that are reported by a service node, where the first generation unit 31 is configured to: when it is determined according to the quintuple information of the backward flow that the backward flow is generated, generate a status value that is the same as that of the packet in the packet flow for the a packet in the backward flow;

the first sending unit 32 is configured to send the status value to a flow classification device, where the flow classification device adds the status value to the packet of the backward flow;

the second generation unit 34 is configured to generate a predetermined value that is the same as that of the packet in the packet flow for the packet in the backward flow; and the second sending unit 35 is configured to send the predetermined value to the flow classification device, where the flow classification device adds the predetermined value to the packet of the backward flow.

Embodiment 6 of the present application describes another central control device, where the central control device includes an interface and a processor, where the processor is configured to generate a status value; and the interface is configured to send the status value to a flow classification device, and instruct the flow classification device to add the status value to a packet.

In one embodiment, the processor is further configured to monitor a topology status of service nodes, and update the status value when the topology status of the service nodes changes; and the interface is further configured to send an updated status value to the flow classification device, where the flow classification device adds the updated status value to a packet of a currently generated packet flow.

In one embodiment, the processor is further configured to generate a predetermined value for the packet; and the interface is further configured to send the predetermined value to the flow classification device, where the flow classification device adds the predetermined value to the packet.

In one embodiment, the processor is configured to use, as the predetermined value, a value randomly selected from a resource pool, or a value obtained by converting a transmission parameter shared by all packets in a service flow in which the packet is located, or a value selected according to a load status of a service node.

In one embodiment, the interface is further configured to receive quintuple information of the packet flow in which the packet is located and quintuple information of a corresponding backward flow that are reported by a service node, and send a status value and a predetermined value that are generated by the processor for a packet in the backward flow to a flow classification device, where the flow classification device adds the status value and the predetermined value to the packet of the backward flow; and the processor is configured to: when it is determined according to the quintuple information of the backward flow that the backward flow is generated, generate the status value and the predetermined value that are the same as those of the packet in the packet flow for the packet in the backward flow.

The load balancing device, central control device, and flow classification device that are involved in Embodiment 4, Embodiment 5, and Embodiment 6 of the present application may be the load balancing module, central control module, and flow classification module that are involved in Embodiment 1 to Embodiment 3.

A person skilled in the art should understand that the embodiments of this application can provide a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more processes in the flowcharts and/or one or more blocks in the block diagrams.

These computer program instructions may also be stored in a computer readable memory that can instruct the computer or another programmable data processing device to work in a particular manner, so that the instructions stored in the computer readable memory generate an artifact that includes an instruction apparatus. The instruction apparatus implements a function in one or more processes in the flowcharts and/or one or more blocks in the block diagrams.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps or operations for implementing a function in one or more processes in the flowcharts and/or one or more blocks in the block diagrams.

In a typical configuration, the computer device includes one or more processors (CPU), an input/output interface, a network interface, and a memory. The memory may include forms of a volatile memory, a random access memory (RAM), and/or a non-volatile memory in computer readable media, such as a read-only memory (ROM) or a flash memory (flash RAM). The memory is an example of the computer readable media. The computer readable media include permanent and temporary, and removable and irremovable media, and information may be stored by using any method or technology. The information may be a computer readable instruction, a data structure, a program module, or other data. For example, computer storage media include, but are not limited to, a phase change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a cassette-type tape, a magnetic tape, a disk storage or other magnetic storage devices or any other non-transmission media, and can be used to store information that can be accessed by a calculation device. According to the definitions in this specification, the computer readable media do not include non-persistent computer readable media (transitory media), such as a modulated data signal and carrier.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. A packet processing method comprising:
based on a dynamically-generated value carried in a packet and associated with a topology, determining a plurality of service nodes associated with the value as candidate next hops of the packet;
selecting a service node from the determined plurality of service nodes as a next hop of the packet; and
sending the packet to the selected service node.

2. The packet processing method according to claim 1, wherein the topology is determined based on a network topology of a time point at which a packet flow of the packet is generated.

3. The packet processing method according to claim 1, wherein the topology comprises service nodes of a same service, wherein the determined plurality of service nodes are of the service nodes of the same service.

4. The packet processing method according to claim 1, wherein the value carried in the packet is added by a flow classification module.

5. The packet processing method according to claim 1, wherein the selecting a service node from the determined plurality of service nodes as a next hop of the packet comprises:
performing a load balancing operation based on the plurality of service nodes, and
selecting one service node according to an operation result of the load balancing operation.

6. The packet processing method of according to claim 1, wherein the packet is one of a plurality of packets in a packet flow, wherein each of the plurality of packets carries the same value.

7. The packet processing method of according to claim 1, wherein the value is added to a packet of a backward flow, such that the packet of the backward flow is processed in the topology identified by the value.

8. A device comprising:
a memory storing instructions; and
a processor coupled to the memory to execute the instructions to cause the device to:
based on a dynamically-generated value carried in a packet and associated with a topology, determine a plurality of service nodes associated with the value as candidate next hops of the packet;
select a service node from the determined plurality of service nodes as a next hop of the packet; and
send the packet to the selected service node.

9. The device according to claim 8, wherein the topology is determined based on a network topology of a time point at which a packet flow of the packet is generated.

10. The device according to claim 8, wherein the topology comprises service nodes of a same service, wherein the determined plurality of service nodes are of the service nodes of the same service.

11. The device according to claim 8, wherein the value carried in the packet is added by a flow classification module.

12. The device according to claim 8, wherein the processor coupled to the memory to execute the instructions to cause the device to:
perform a load balancing operation based on the plurality of service nodes, and
select one service node according to an operation result of the load balancing operation.

13. The device according to claim 8, wherein the packet is one of a plurality of packets in a packet flow, wherein each of the plurality of packets carries the same value.

14. The device according to claim 8, wherein the value is added to a packet of a backward flow, such that the packet of the backward flow is processed in the topology identified by the value.

15. A non-transitory computer-readable medium having instructions stored therein, which when executed by a processor of a device, cause the device to perform a packet processing method, the packet processing method comprising:
based on a dynamically-generated value carried in a packet and associated with a topology, determining a plurality of service nodes associated with the value as candidate next hops of the packet;
selecting a service node from the determined plurality of service nodes as a next hop of the packet; and
sending the packet to the selected service node.

16. The non-transitory computer-readable medium according to claim 15, wherein the topology is determined based on a network topology of a time point at which a packet flow of the packet is generated.

17. The non-transitory computer-readable medium according to claim 15, wherein the topology comprises service nodes of a same service, wherein the determined plurality of service nodes are of the service nodes of the same service.

18. The non-transitory computer-readable medium according to claim claim 15, wherein the value carried in the packet is added by a flow classification module.

19. The non-transitory computer-readable medium according to claim 15, wherein the packet processing method further comprises:
performing a load balancing operation based on the plurality of service nodes, and
selecting one service node according to an operation result of the load balancing operation.

20. The non-transitory computer-readable medium according to claim 15, wherein the packet is one of a plurality of packets in a packet flow, wherein each of the plurality of packets carries the same value.

* * * * *

UNITED STATES PATENT AND TRADEMARK OFFICE
CERTIFICATE OF CORRECTION

| | |
|---|---|
| PATENT NO. | : 11,743,176 B2 |
| APPLICATION NO. | : 17/532400 |
| DATED | : August 29, 2023 |
| INVENTOR(S) | : Yong Huang |

It is certified that error appears in the above-identified patent and that said Letters Patent is hereby corrected as shown below:

In the Claims

In Claim 18, Column 24, Line 42, delete "according to claim claim 15" and insert --according to claim 15--.

Signed and Sealed this
Thirty-first Day of October, 2023

Katherine Kelly Vidal
*Director of the United States Patent and Trademark Office*